United States Patent
Yoshida

(10) Patent No.: US 8,773,554 B2
(45) Date of Patent: Jul. 8, 2014

(54) IMAGING APPARATUS, LENS UNIT, AND METHODS FOR CONTROLLING THE SAME

(71) Applicant: Canon Kabushiki Kaisha, Tokyo (JP)

(72) Inventor: Tomokazu Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/907,657

(22) Filed: May 31, 2013

(65) Prior Publication Data
US 2013/0265474 A1 Oct. 10, 2013

Related U.S. Application Data

(63) Continuation of application No. 12/870,598, filed on Aug. 27, 2010, now Pat. No. 8,477,214.

(30) Foreign Application Priority Data

Aug. 31, 2009 (JP) .................................. 2009-200242

(51) Int. Cl.
H04N 5/225 (2006.01)
H04N 5/76 (2006.01)

(52) U.S. Cl.
USPC ....................................... 348/231.3; 348/361

(58) Field of Classification Search
USPC ........... 348/231.3, 360, 361, 231.7, 180, 187; 396/91, 56, 310
See application file for complete search history.

(56) References Cited

U.S. PATENT DOCUMENTS

| 5,546,126 A * | 8/1996 | Yajima et al. ................. 348/175 |
| 7,768,648 B2 * | 8/2010 | Smith ............................. 356/448 |
| 8,194,136 B1 * | 6/2012 | Askey et al. .................. 348/187 |
| 2003/0189640 A1 * | 10/2003 | Moriya ........................ 348/187 |
| 2012/0236128 A1 * | 9/2012 | Ueda et al. ..................... 348/49 |

FOREIGN PATENT DOCUMENTS

| JP | 2004-356847 A | 12/2004 |
| JP | 2006-279458 A | 10/2006 |
| JP | 2007-057796 A | 3/2007 |

\* cited by examiner

*Primary Examiner* — Tuan Ho
*Assistant Examiner* — Shahbaz Nazrul
(74) *Attorney, Agent, or Firm* — Canon USA Inc. IP Division

(57) ABSTRACT

An imaging apparatus according to the present invention can generate an image from an output of an image sensor to record the image as an image file, and record first information and second information onto the image file as additional information. Accordingly, the imaging apparatus can provide a user or a staff person of a repair center with useful information regarding a failure, repair, and replacement that conventionally could not be provided.

6 Claims, 5 Drawing Sheets

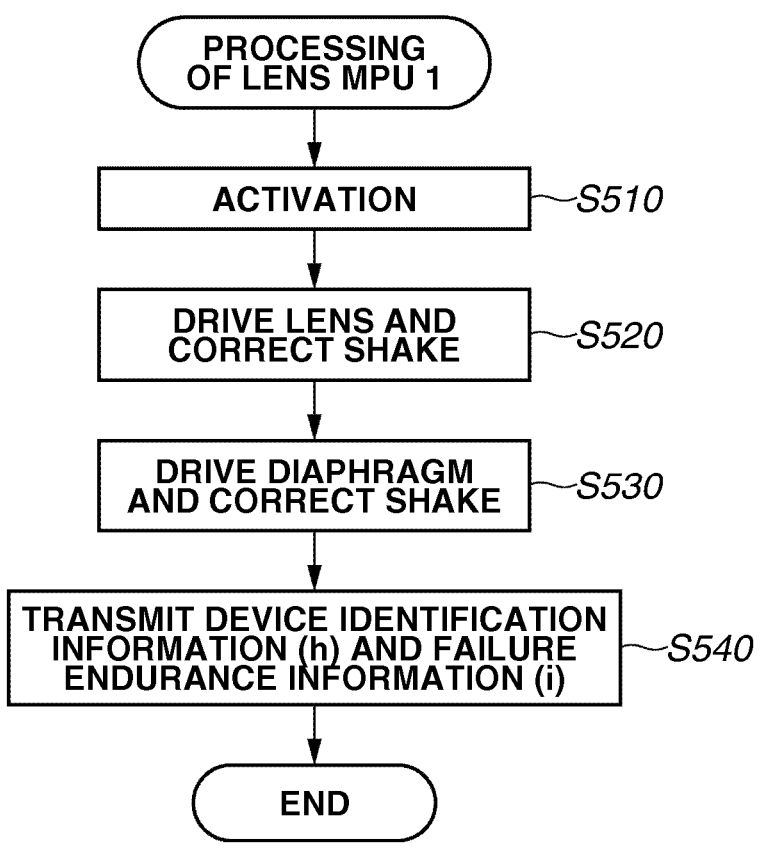

IMAGING APPARATUS, LENS UNIT, AND METHODS FOR CONTROLLING THE SAME

CROSS REFERENCE TO RELATED APPLICATIONS

This application is a Continuation of U.S. patent application Ser. No. 12/870,598 filed Aug. 27, 2010, claims priority from Japanese Patent Application No. 2009-200242 filed Aug. 31, 2009, both of which are hereby incorporated by reference in their entirety.

BACKGROUND OF THE INVENTION

1. Field of the Invention

The present invention relates to an imaging apparatus such as an interchangeable lens type digital camera, and a lens unit.

2. Description of the Related Art

As a conventional technological idea, for example, Japanese Patent Application Laid-Open No. 2004-356847 discusses a method for recording a failure detected by a camera onto a captured image as text data. Japanese Patent Application Laid-Open No. 2004-356847 further discusses a technique of printing out failure information along with printing of the captured image to notify a user of it.

However, the conventional art discussed in the above described Japanese Patent Application Laid-Open No. 2004-356847 still has a problem to be solved for an interchangeable lens type digital camera. Especially, a problem may arise when a failure is attributed to a lens unit, not a camera unit. More specifically, it is difficult for a user possessing a plurality of lens units to find out which lens unit is the cause of a failure. For example, in a company in which a large number of lenses of the same type are possessed and a plurality of users shares them, such as a newspaper publishing company and a news service agency, it is extremely difficult for a user and a staff person of a repair center to find out which lens is the cause of an error.

SUMMARY OF THE INVENTION

According to an aspect of the present invention, an imaging apparatus includes an image sensor configured to capture an image of an object, an acquisition unit configured to acquire first information as device identification information of a mounted lens unit, and second information of the lens unit which is added along with driving of the lens unit, and a recording unit configured to generate an image from an output of the image sensor to record the image as an image file, and record the first information and the second information onto the image file as additional information.

According to another aspect of the present invention, a lens unit which can be mounted on a camera unit includes a diaphragm driving unit capable of controlling a diaphragm based on an instruction from the camera unit, a memory configured to store first information as device identification information and second information of the lens unit which is added along with driving of the lens unit, and a mount which can communicate the first information and the second information to the camera unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flow chart illustrating processing of a lens MPU according to the exemplary embodiment of the present invention.

DESCRIPTION OF THE EMBODIMENTS

Various exemplary embodiments, features, and aspects of the invention will be described in detail below with reference to the drawings.

<Configuration of Interchangeable Lens Type Digital Camera>

Figure 1:
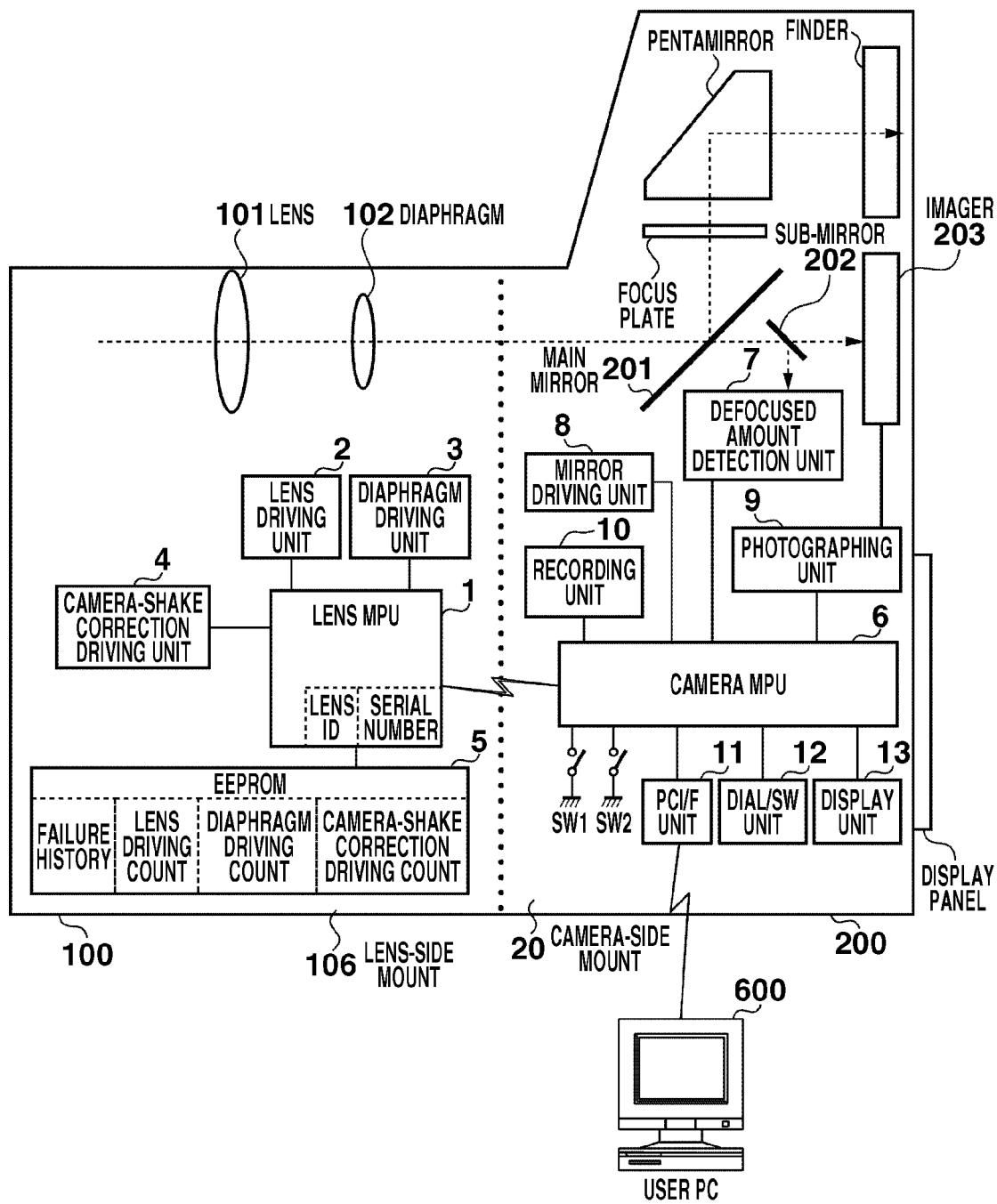
FIG. 1 is a block diagram illustrating a camera system according to an exemplary embodiment of the present invention.

FIG. 1 is a block diagram illustrating a configuration of an interchangeable lens type digital camera which is an example of an imaging apparatus according to an exemplary embodiment of the present invention. The interchangeable lens type digital camera is constituted by a combination of a lens unit 100 and a camera unit 200.

Referring to FIG. 1, the lens unit 100 can be mounted on the camera unit 200. A lens micro processing unit (MPU) 1 performs a control related to the lens unit. A lens driving unit 2 drives a photographic lens 101. A diaphragm driving unit 3 drives a diaphragm 102. A shake correction driving unit 4 drives a camera-shake correction optical system. The lens driving unit 2 and the diaphragm driving unit 3 can control the lens 101 and the diaphragm 102 respectively according to an instruction from a camera MPU 6. An electronically erasable and programmable read only memory (EEPROM) 5 is a nonvolatile memory.

The interchangeable lens is constituted by the above described lens MPU 1, lens driving unit 2, diaphragm driving unit 3, shake correction driving unit 4, and the EEPROM 5. Further, the lens unit 100 is connected to a camera-side mount 20 via a lens-side mount 106 as indicated by the dotted line in FIG. 1, whereby the lens unit 100 is detachably attachable to the camera unit 200 in such a manner that the lens unit 100 and the camera unit 200 can communicate first information and second information. The first information corresponds to device identification information (h) which will be described below. The second information corresponds to failure endurance information (i) which will be described below.

On the other hand, the camera unit 200 is configured in the following manner. A camera MPU 6 performs a control related to a camera body. A defocused amount detection unit 7 photoelectrically converts an object image guided by a focus detection optical system (not shown), and outputs the converted object image as a potential change. A defocused amount, which is an out-of-focus amount required for auto focus adjustment, is calculated from an output of the defocused amount detection unit 7.

An imager 203 serves as an image sensor for capturing an image of an object. A mirror driving unit 8 retracts a main mirror 201 and a sub-mirror 202 disposed on an optical axis when a photo is taken. A photographing unit 9 generates a captured image according to a signal output from the imager 203. A recording unit 10 records the captured image onto an attachable/detachable memory card as a file. In the present exemplary embodiment, the recording unit 10 records the captured image onto the attachable/detachable memory card. However, for example, the recording unit 10 may record the captured image onto a predetermined server 620 or PC as a file via a connection to an internet 610.

A PC interface (I/F) unit 11 can be connected via a cable to a user PC 600 which includes or can connect to a display. When the PC I/F unit 11 is connected to the user PC 600, a PC application is activated by the user PC 600. By using the application, the captured image file stored in the memory card mounted on the recording unit 10 can be copied or moved to the user PC 600. Alternatively, the captured image file can be copied or moved to the PC by removing the memory card from the recording unit 10 and mounting the memory card to a card reader which is a PC peripheral equipment. When the recording unit 10 records the captured image to the predetermined server 620 or PC via the internet 610 as a file, it is possible to copy or move the captured image file to the PC by accessing the recorded file.

A dial/switch (SW) unit 12 is used to perform various settings of the camera (for example, a shutter speed, an aperture value, and an International Organization for Standardization (ISO) sensitivity). A display unit 13 displays the various settings of the camera and the captured image.

A switch SW1 is turned on by a first stroke operation (half-pressing) of a release button. A switch SW2 is turned on by a second stroke operation (full-pressing) of the release button.

<Processing Flow>

Figure 4:
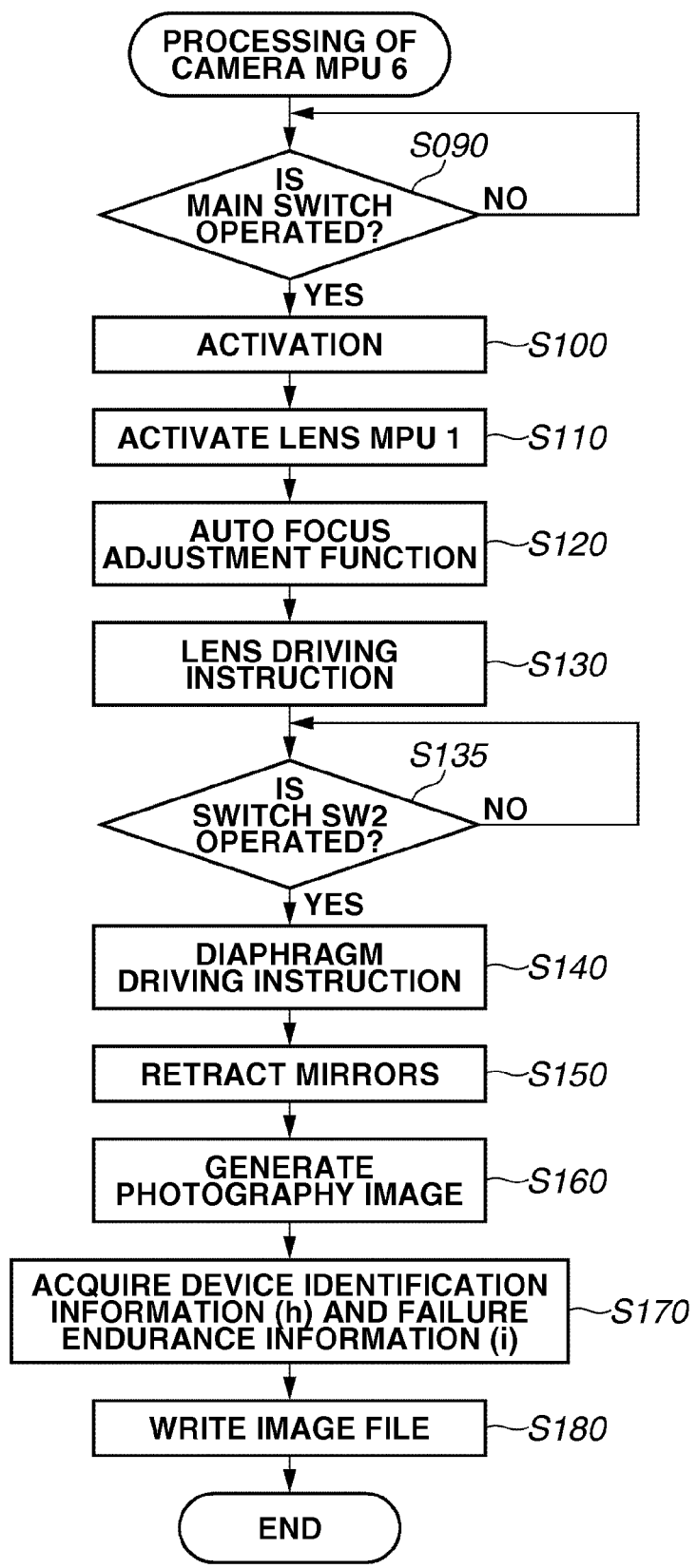
FIG. 4 is a flow chart illustrating processing of a camera micro processing unit (MPU) according to the exemplary embodiment of the present invention.

Next, a processing flow will be described with reference to FIGS. 4 and 5. The processing illustrated in FIG. 4 is controlled based on an instruction of the camera MPU 6 unless otherwise indicated. The processing illustrated in FIG. 5 is controlled based on an instruction of the lens MPU 1 unless otherwise indicated.

When it is detected that a main switch (not illustrated) is turned on (YES in step S090), in step S100, the camera MPU 6 is activated. In steps S110 and S510, the camera MPU 6 activates the lens MPU 1. When the camera MPU 6 and the lens MPU 1 are activated, the camera MPU 6 and the lens MPU 1 function as a camera system.

In the present exemplary embodiment, in step S120, the auto focus adjustment function operates based on an instruction of the camera MPU 6 when the switch SW 1 is turned on. As described above, the defocused amount, which is the out-of-focus amount required for auto focus adjustment, is calculated from the output of the defocused amount detection unit 7.

In step S130, the camera MPU 6 transmits a lens driving instruction to the lens MPU 1 via communication based on the output defocused amount, and also transmits via communication that the switch SW 1 is turned on.

In step S520, upon receiving the lens driving instruction from the camera MPU 6 via communication, the lens MPU 1 controls the lens driving unit 2 to perform focus adjustment. Further, the lens MPU 1 controls the shake correction driving unit 4 to perform shake correction such as camera-shake correction.

When the switch SW2 is turned on (YES in step S135), the camera MPU 6 detects it and performs a series of operations for capturing an image. In step S140, the camera MPU 6 transmits a diaphragm driving instruction to the lens MPU 1 via communication, and also transmits via communication that the switch SW 2 is turned on. In step S530, upon receiving the diaphragm driving instruction, the lens MPU 1 controls the diaphragm driving unit 3 to adjust the diaphragm. Further, the lens MPU 1 controls the shake correction driving unit 4 to perform shake correction suitable for the photographing operation.

In step S150, the camera MPU 6 controls the mirror driving unit 8 to retract the main mirror 201 and the sub-mirror 202. While the mirrors are in a retracted state, the camera MPU 6 puts the imager 203 in an exposed state in order to generate an image file. In step S160, the camera MPU 6 generate a captured image by controlling the photographing unit 9 based on an output of the imager 203 in the exposed state.

Then in steps S170 and S540, the camera MPU 6 communicates with the lens MPU 1, and reads out and acquires device identification information (h) and failure endurance information (i) of the interchangeable lens from the lens MPU 1. The device identification information (h) is information added to the lens MPU 1 when the lens unit 100 is manufactured. The failure endurance information (i) includes character as information to be added to the EEPROM 5 as the second information of the lens unit 100 according to driving of the lens unit 100 after it is manufactured, as will be described below.

More specifically, a lens ID which indicates a type of an interchangeable lens and a serial number which is unique to each interchangeable lens even for lenses having the same lens ID, are written and stored in the lens MPU 1 as the device identification information (h). The camera MPU 6 can identify the lens unit 100 by reading out the lens ID and the serial number as the device identification information (h). Further, the lens MPU 1 acquires the failure endurance information (i) of the lens unit 100 by reading out it from the EEPROM 5.

While in operation, the lens unit 100 detects a failure of the lens driving unit 2, the diaphragm driving unit 3, and the camera-shake correction driving unit, and then writes a history of failures onto the EEPROM 5 as a failure history (j). Thus, the lens unit 100 stores the failure endurance information (i) in the EEPROM 5.

More specifically, the failure history (j) has, for example, four kinds of information. First, information about that a voltage is detected for each of the driving systems such as the diaphragm driving system and the lens driving system, and whether exceedance of the voltage from a predetermined value occurs. Second, information about whether, despite execution of lens driving in the lens driving unit 2, an optical displacement gauge for detecting an amount of a change in lens driving does not indicate a change according to the lens driving. Third, information about whether, despite execution of diaphragm driving in the diaphragm driving unit 3, a mechanical switch for identifying a position of the diaphragm does not enter a predetermined status. Fourth, information about whether, despite execution of camera-shake correction in the shake correction driving unit 4, an output of a hall element for detecting a camera-shake correction amount indicates an abnormal value. These statuses are detected as a failure. When abnormality occurs, the abnormality is written in the EEPROM 5 as the failure history (j).

Further, while in operation, the lens MPU 1 counts the number of times that the lens driving unit 2 is driven, the number of times that the diaphragm driving unit 3 is driven, and the number of times that the camera-shake correction driving unit is driven, and writes these counted numbers in the EEPROM 5 as endurance information (k). The failure history (j) and the endurance information (k) are read out from the lens MPU 1 to the camera MPU 6 via communication as the failure endurance information (i).

In the present exemplary embodiment, the failure history (j) and the endurance information (k) are both set as data to be read out from the lens MPU 1 to the camera MPU 6 via communication. However, for example, even in case that the failure history (j) is read out but the endurance information (k) is not read out, it is also possible to obtain the effects of the technological idea of the present application. In this case, however, a user and a staff person cannot detect deterioration in the image quality due to endurance. Further, even in case that the failure history (j) is not read out but the endurance information (k) is read out, it is also possible to obtain the effects of the technological idea of the present application. In this case, however, a user and a staff person cannot detect deterioration in the image quality due to a failure.

The above described device identification information (h) and the failure endurance information (i) are added to the captured image file as photographic information (additional information) on a random access memory (RAM) (not illustrated). In step S180, the image file to which with the device identification information (h) and the failure endurance information (i) are added is written in the memory card mounted on the recording unit 10. More specifically, the device identification information (h) and the failure endurance information (i) are added to the captured image file as the photographic information (additional information) according to a file format of the exchangeable image file format (EXIF) which is a file format for a digital camera.

The photographic information includes a camera model name, a photographing data and time, a Tv (shutter speed), an Av (aperture value), an ISO sensitivity, and others. According to the specification of the EXIF, the EXIF includes Maker-Note where manufacturers can embed any custom information. The above described device identification information (h) and the failure endurance information (i) are embedded in the MakerNote.

The series of operations for capturing an image is completed by the above described steps.

<Application>

After taking a picture, a user connects the PC I/F unit 11 and the user PC 600 via a cable. Due to activation of the special PC application by the user PC 600, the captured image file stored in the memory card mounted on the recording unit 10 is copied or moved onto the user PC 600.

Figure 2:
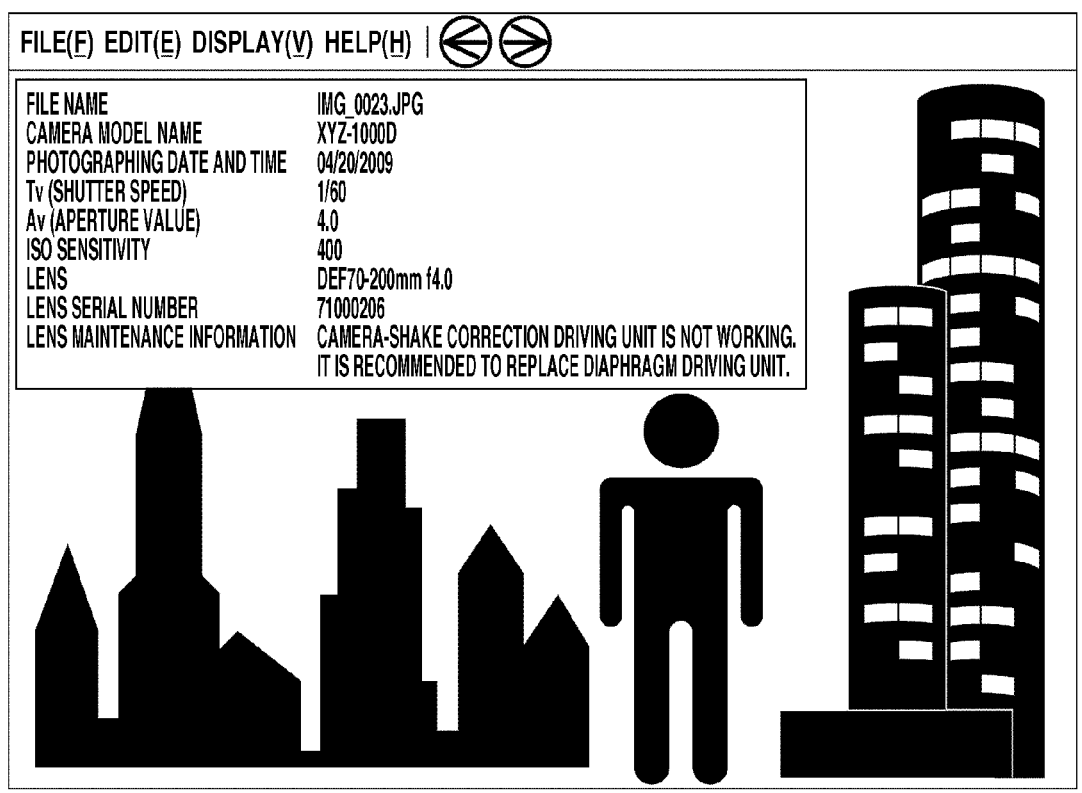
FIG. 2 illustrates a display of a personal computer (PC) application according to the exemplary embodiment of the present invention.

As shown in FIG. 2, when the captured image file is opened by the special PC application, the following information is displayed, in addition to the file name. More specifically, the photographic information such as a file name, a camera model name, a photographing date and time, a Tv (shutter speed), an Av (aperture value), an ISO sensitivity, and others which are included in the EXIF information are displayed. Further, the device identification information (h) and the failure endurance information (i) embedded in the MakerNote are also read out.

The screen displays the device identification information (h), more specifically, the type of the lens unit 100 which is determined from the lens ID (the item "LENS" in FIG. 2), and the serial number (the item of "LENS SERIAL NUMBER" in FIG. 2). Further, the failure endurance information (i) is displayed on the screen of the display of the user PC 600 as the item of "LENS MAINTENANCE INFORMATION" in FIG. 2.

For example, when the failure history (j) of the camera-shake correction driving unit is read out, a message "CAMERA-SHAKE CORRECTION DRIVING UNIT IS NOT WORKING" is displayed on the screen. Similarly, if the failure histories (j) of the lens driving unit 2 and the diaphragm driving unit 3 are read out, messages "LENS DRIVING UNIT IS NOT WORKING" and "DIAPHRAGM DRIVING UNIT IS NOT WORKING" are displayed on the screen.

Further, for example, it is assumed that an endurance operation count of the diaphragm driving unit 3 of the mounted lens unit 100 is million times. In this case, for indicating as the endurance information (k) that the diaphragm driving unit 3 is driven beyond million times when the image is captured, a message "IT IS RECOMMENDED TO REPLACE DIAPHRAGM DRIVING UNIT" is displayed on the screen. For indicating as the endurance information (k) that the diaphragm driving unit 3 is not driven beyond million times when the image is captured, no message is displayed in this item, particularly. For notifying a user or the like that the diaphragm driving unit 3 is driven within the endurance operation count, instead of no appearance of any message, a message "DIAPHRAGM DRIVING UNIT IS DRIVEN WITHIN ENDURANCE OPERATION COUNT" may be displayed.

Similarly, if it is detected from the endurance information (k) that the lens driving unit 2 and the camera-shake correction driving unit are driven beyond the respective endurance counts, messages "IT IS RECOMMENDED TO REPLACE LENS DRIVING UNIT" and "IT IS RECOMMENDED TO REPLACE CAMERA-SHAKE DRIVING UNIT" are displayed on the screen. If they are not driven beyond the endurance counts, no message is displayed or the information indicating to a user that they are driven within the endurance counts is displayed.

Figure 3:
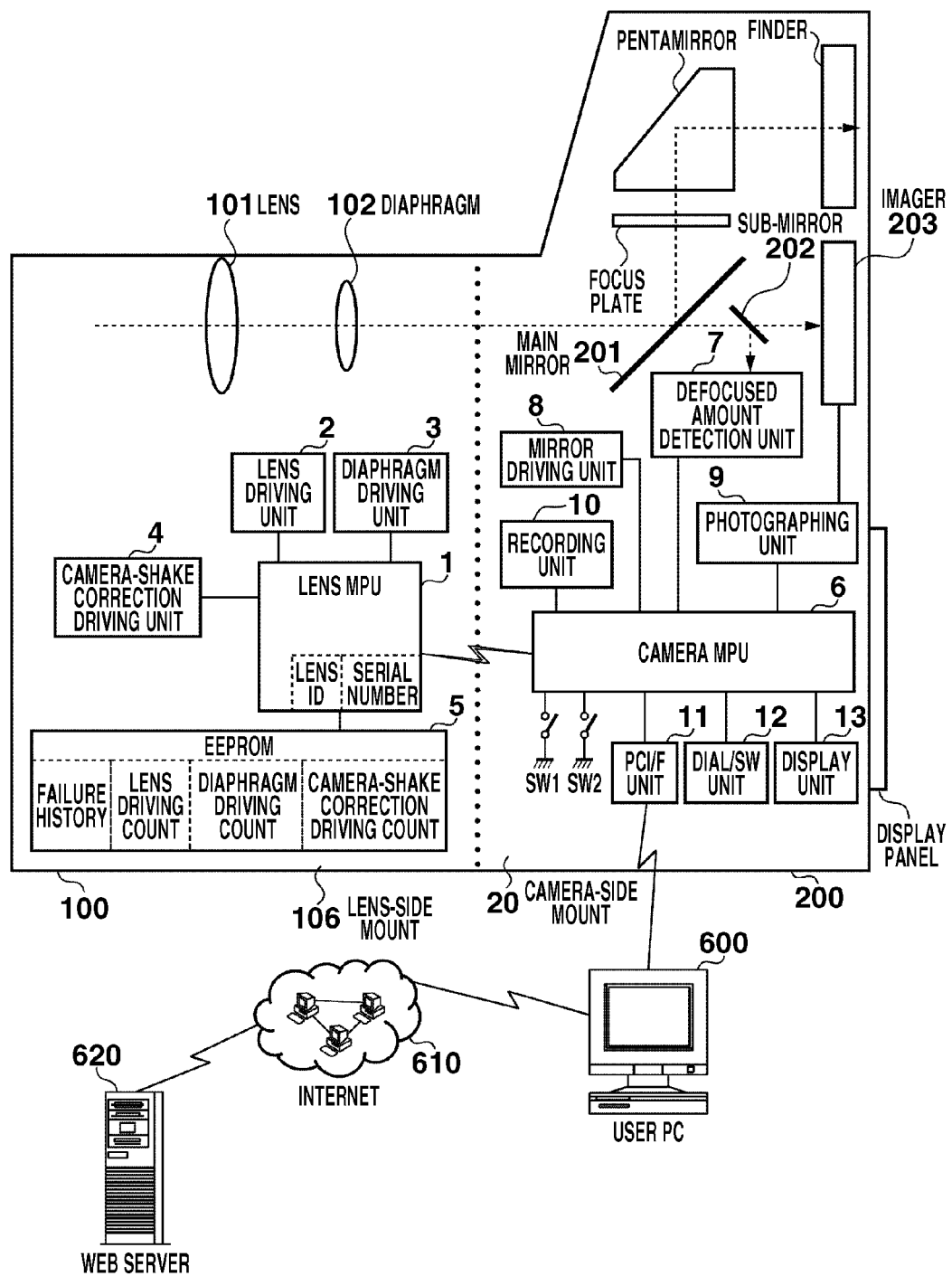
FIG. 3 is a block diagram illustrating a camera system according to a variation of the exemplary embodiment of the present invention.

In the present exemplary embodiment, the special PC application program is used as a means for displaying the device identification information and the failure endurance information of the interchangeable lens. However, for example, as shown in FIG. 3, the user PC 600 may access to a WEB server 620 via the internet 610 after activating a WEB browser which is a generally-used PC application. The present exemplary embodiment can be implemented by causing a program stored in the special WEB server 620 to display the device identification information and the failure endurance information of the interchangeable lens on the WEB browser via the internet 610.

Further, the present invention can be also realized by supplying a software (or program) capable of realizing the functions of the above described exemplary embodiment to a system or an apparatus via a network or various kinds of storage media, and causing a computer (or, for example, a CPU or a MPU) of the system or the apparatus to read out and execute the program.

In the above described configuration, the device identification information (h) and the failure endurance information (i) of the lens unit are stored by being embedded in and added to a captured image file. Therefore, it is possible to provide an interchangeable lens type camera system capable of notifying a user of the failure history and the endurance information in such a manner that an interchangeable lens and a captured image file are associated with each other. Further, it is possible to provide an interchangeable lens type digital camera system enabling a staff person of a repair center to obtain useful information regarding the failure, repair and replacement by receiving the captured image file from the user.

Even when a failure is attributed to the lens unit, not the camera unit, a notification can be provided to a user or the like.

Further, because it is not necessary to print out an image taken by the digital camera, the present exemplary embodiment is also suitable when most of captured images are viewed only on the user PC 600. Further, the present exemplary embodiment is also suitable for a corporate user such as an employee of a newspaper publishing company and a news service agency, because such a corporate user seldom prints out a captured image due to the nature of its business. Further, the present exemplary embodiment is also suitable in case that a captured image is digitally distributed onto the internet 610.

According to the exemplary embodiment of the present invention, it is possible to provide a user and a staff person of a repair center with useful information regarding a failure, repair, and replacement that conventionally could not be provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus which is able to read an image file, the information processing apparatus comprising:
a reading unit configured to read information from the image file; and
a display control unit configured to control a display such that an image read by the reading unit, information corresponding to a lens identification read by the reading unit, and driving information read by the reading unit, are displayed on the display, wherein the driving information includes an information corresponding to a number of driving times of a lens unit supported by the lens identification.

2. The information processing apparatus according to claim 1, wherein the display control unit is configured to control the display such that failure history information is displayed on the display.

3. The lens unit according to claim 1, wherein the driving information includes a number of driving times that a lens driving unit is driven.

4. The lens unit according to claim 1, wherein the driving information includes a number of driving times that a diaphragm driving unit is driven.

5. The lens unit according to claim 1, wherein the driving information includes to a number of driving times that a shake correction driving unit is driven.

6. A method for controlling an information processing apparatus which is able to read an image file, comprising:
reading an image file; and
controlling a display such that an image read from the image file, information corresponding to a lens identification which is read from the image file, and driving information which is read from the image file, are displayed on the display, wherein the driving information includes an information corresponding to a number of driving times of a lens unit supported by the lens identification.

* * * * *